(12) United States Patent
Yanai et al.

(10) Patent No.: US 7,610,132 B2
(45) Date of Patent: Oct. 27, 2009

(54) POWER STEERING SYSTEM FOR ALL-TERRAIN BUGGY VEHICLE

(75) Inventors: Hideo Yanai, Saitama (JP); Sumitaka Ogawa, Saitama (JP); Tomokazu Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 491 days.

(21) Appl. No.: 11/359,545

(22) Filed: Feb. 23, 2006

(65) Prior Publication Data

US 2006/0212200 A1    Sep. 21, 2006

(30) Foreign Application Priority Data

Feb. 24, 2005 (JP) .............................. 2005-048576
Feb. 24, 2005 (JP) .............................. 2005-048578

(51) Int. Cl.
    *B62D 6/00*    (2006.01)
(52) U.S. Cl. ........................................ 701/41; 180/443
(58) Field of Classification Search ............. 701/41–44; 180/438–442, 403
    See application file for complete search history.

(56) References Cited

U.S. PATENT DOCUMENTS 7,070,019 B2 *  7/2006  Takamoto et al. ............ 180/403
2004/0099470 A1  5/2004  Tanigaki et al.

2005/0257989 A1  11/2005  Iwami et al.
2005/0257990 A1  11/2005  Shimizu

FOREIGN PATENT DOCUMENTS

| CA | 2476703 A1 | 8/2005 |
| GB | 2423289 A | 8/2006 |
| JP | 2004-231011 A | 8/2004 |

\* cited by examiner

*Primary Examiner*—Yonel Beaulieu
(74) *Attorney, Agent, or Firm*—Birch, Stewart, Kolasch & Birch, LLP (57) ABSTRACT

A power steering system of an all-terrain buggy vehicle is provided to protect a power assist motor against obstacles encountered during traveling on the irregular ground, or the like. In a power steering system of a four-wheeled buggy vehicle in which a steering shaft rotated in response to the operation of a handlebar is disposed forward of an engine located at the almost-middle in the back-and-forth direction of a body frame, and the rotary shaft of a power assist motor is disposed perpendicular to the steering shaft, the power assist motor is located inside the body frame.

15 Claims, 12 Drawing Sheets

POWER STEERING SYSTEM FOR ALL-TERRAIN BUGGY VEHICLE

CROSS-REFERENCE TO RELATED APPLICATION

The present application claims priority under 35 U.S.C. §119 to Japanese Patent Application Nos. 2005-048576 and 2005-048578, filed Feb. 24, 2005, the entire contents of which are hereby incorporated by reference.

BACKGROUND OF THE INVENTION

1. Field of the Invention

The present invention relates to a power steering system for an all-terrain buggy vehicle.

2. Description of Background Art

Buggy type all-terrain vehicles provided with a power steering system have been conventionally known in the art, for example Japanese Patent Laid-open No. 2004-231011.

In the conventional configuration, in order to enhance protectability of a power assist motor against stones and the like jumping from the road surface, the power assist motor is arranged to pass over above the frame member of a body frame. Taking into consideration traveling on the irregular ground on which obstacles such as plants and the like are present, it is preferred that protectability of the power assist motor against also obstacles other than stones and the like jumping from the road surface should be enhanced.

Additionally, in the conventional configuration, the power assist motor is disposed above the front arm of a suspension, or between the suspension and the body frame. If a long cushion stroke suitable to irregular ground traveling is necessary, therefore, it is limited to secure a space for the cushion stroke in some cases.

Accordingly, the present invention provides a power steering system for an all-terrain buggy vehicle which satisfactorily protects a power steering motor from obstacles encountered during the travel on irregular ground, and which easily secures a space for a cushion stroke.

SUMMARY AND OBJECTS OF THE INVENTION

According to a first aspect of the present invention, a power steering system (e.g., the power steering system 80 of an embodiment) for an all-terrain buggy vehicle (e.g., the buggy type four-wheeled vehicle 1 of the embodiment), includes: a steering shaft (e.g., the steering shaft 25 of the embodiment) rotated in response to operation of a handlebar, the steering shaft being disposed forward of an engine (e.g., the engine 5 of the embodiment) located at the almost-middle in the back-and-forth direction of a body frame; and a power assist motor (e.g., the power assist motor 82 of the embodiment) having a rotary shaft (e.g., the rotary shaft 82b of the embodiment) disposed perpendicular to the steering shaft. Further, the power assist motor is located inside the body frame.

With this configuration, since the power assist motor is surrounded by frame members constituting the body frame, it is difficult to apply a load from the outside to the power assist motor, and it becomes easy to ensure a space for a long cushion stroke suitable for traveling on the irregular ground.

According to a second aspect of the present invention, the power assist motor is disposed rearward of the steering shaft and obliquely with respect to the back-and-forth direction of a vehicle body as viewed from above.

With this configuration, the power assist motor, which is relatively heavy, is placed near the middle of the vehicle body, while the rearward extension of the power assist motor can be minimized.

According to a third aspect of the present invention, the power assist motor is disposed rearward of a front wheel suspension (e.g., the front suspension 15 of the embodiment).

With this configuration, the concentration of the weight of the power assist motor on the front wheels can be suppressed.

According to a fourth aspect of the present invention, the front wheel suspension includes an arm support member for suspending the front wheel (e.g., the intermediate rear support bracket 48 of the embodiment) in the body frame, and the power assist motor is disposed above the arm support member for suspending the front wheel.

With this configuration, the power assist motor does not reduce the minimum height of the vehicle.

According to a first aspect of the present invention, the axis of the power assist motor is in vicinity of the centerline of the vehicle body in a widthwise direction thereof.

With this configuration, the satisfactory weight balance of the relatively heavy power assist motor can be provided with respect to the left and right of the vehicle body.

According to the first aspect of the present invention, the power assist motor can be satisfactorily protected from obstacles encountered during traveling on the irregular ground or the like and a space for a cushion stroke can be ensured with ease.

According to the second aspect of the present invention, while the concentration of weight mass can be provided by disposing the power assist motor near the middle of the vehicle body, the interference between the power assist motor and the engine can be avoided satisfactorily.

According to the third aspect of the present invention, an increase in load applied to the front wheels due to provision of the power assist motor can be minimized.

According to the fourth aspect of the present invention, it is possible to prevent reduction in the minimum height of the vehicle due to the provision of the power assist motor.

According to the fifth aspect of the present invention, the satisfactory weight balance of the power assist motor can be provided with respect to the left and right of the vehicle body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, preferred embodiments of the present invention will be described with reference to the drawings. It is to be noted that directions, such as front, back, left and right, are the same as those in a vehicle unless otherwise specified. In the drawings, arrow FR denotes the front of a vehicle, arrow LH leftward of the vehicle, and arrow UP above the vehicle.

A buggy type four-wheeled vehicle (irregular ground travel vehicle) is the so-called ATV (All-Terrain Vehicle) which includes left and right front wheels 2 and rear wheels 3, relatively large diameter, low-pressure balloon tires, disposed at the front and rear of a vehicle body reduced in size and weight, and which enhances road ability particularly on the irregular ground by satisfactorily ensuring a minimum-height.

An engine 5 serving as the prime mover of the buggy type four-wheeled vehicle 1 is mounted on the almost-middle portion of a body frame 4. The engine 5 is a water-cooled, single cylinder engine and is arranged in the so-called longitudinal engine layout in which the rotary axis of a crankshaft is extended in the forward-and-back direction of the vehicle. A crankcase 6 constituting the lower portion of the engine 5 also serves as a transmission case. Propeller shafts 8*f* and 8*r* extend forward and rearward from positions offset, e.g., leftward at the front and rear of the crankcase 6, respectively.

Figure 4:
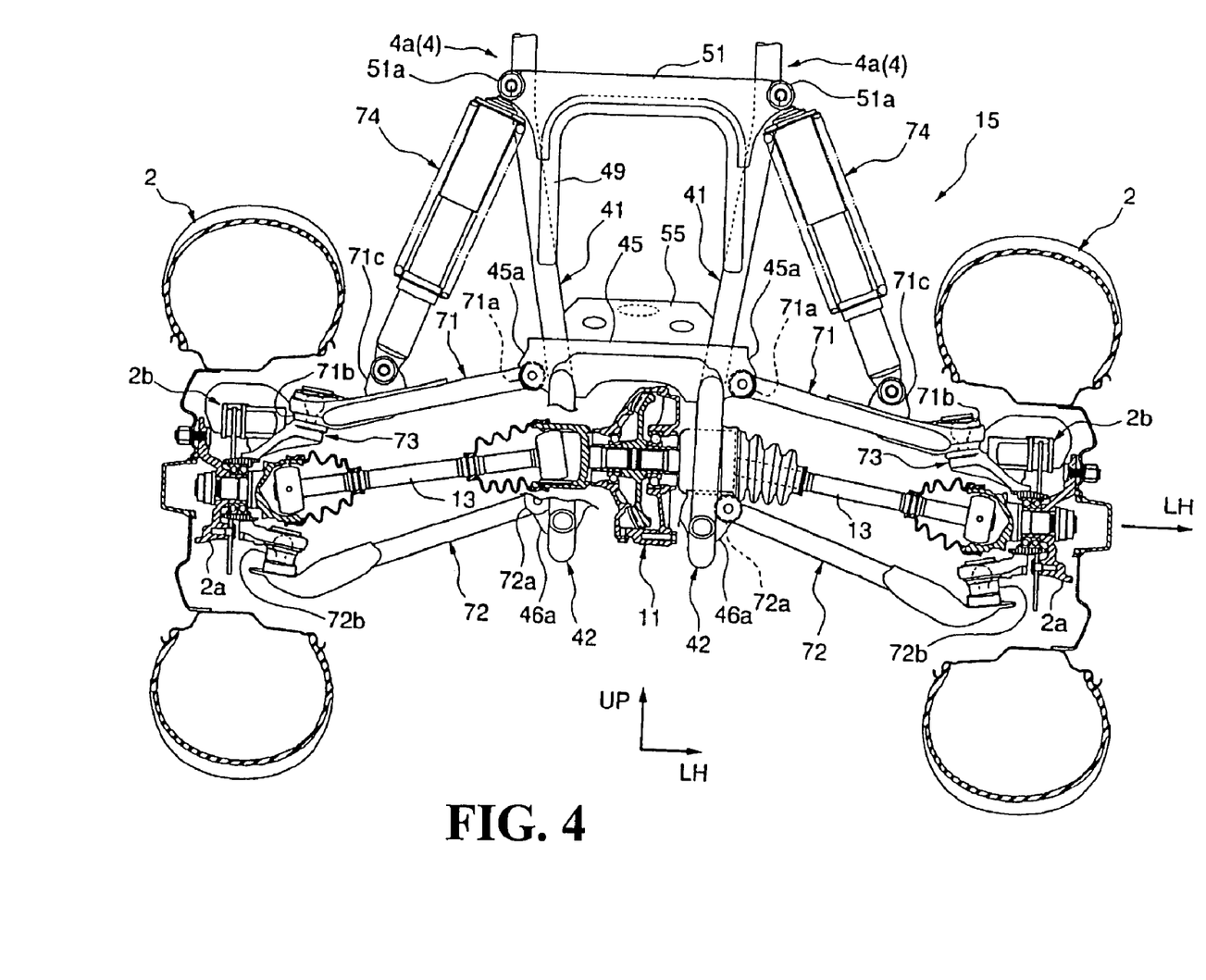
FIG. 4 is a view as viewed from arrow A in FIG. 1.

The propeller shafts 8*f*, 8*r* are connected, at the lower front and lower rear of the body frame 4, to the front wheels 2 and the rear wheels 3 for power transmission through a front reduction gear 11 and a rear reduction gear 12, respectively, and through corresponding drive shafts (only a front drive shaft is denoted with reference numeral 13 in FIG. 4). The drive shafts extend laterally from the front reduction gear 11 and the rear reduction gear 12, respectively. The front wheels 2 and the rear wheels 3 are suspended, at the front and the rear of the body frame 4, by an independent suspension type (specifically, double wish-bone type) front suspension 15 (front wheel suspension, see FIG. 4) and a rear suspension (not shown), respectively.

In the engine 5, a throttle body 17 is connected to the rear of a cylinder portion 7 extending upward from the crankcase 6 and an air cleaner case 18 is connected to the rear portion of the throttle body 17. On the other hand, an exhaust pipe 19 is connected at its proximal portion to the front of the cylinder portion 7. The exhaust pipe 19 extends forward of the cylinder portion 7, then returns backward and connects at its front end with a silencer 21 disposed at the rear of the body.

A fuel tank 22 and a buggy seat 23 are mounted in this order on the widthwise middle portion of the upper body of the buggy type four-wheeled vehicle 1. A handlebar 24 formed with left and right grips is disposed at a position obliquely upward and forward of the fuel tank 22. This handlebar 24 is secured to the upper end of a steering shaft 25 extending vertically and linearly. A battery 94 serving as a vehicle power supply is disposed at a position below and backward of the seat 23.

The steering shaft 25 is slantingly mounted so that its upper portion may be located rearward. The fuel tank 22 is located immediately rearward of the upper part of the steering shaft 25 and the seat 23 is located immediately rearward of the fuel tank 22. The engine 5 is spaced rearward a desired distance from the lower portion of the steering shaft 25.

A radiator 26 for cooling the engine 5 is disposed forward of the lower part of the steering shaft 25. The radiator 26 is of a down-flow type (longitudinal flow type). That is to say, an inflow side hose 27 extending from, forward and almost parallel to, the cylinder portion 7 of the engine 5 is connected at its front end to the upper tank of the radiator. In addition, an outflow side hose 28 is connected at its front end to the lower tank of the radiator. The outflow side hose 28 extends rearward in a crank shape, toward the crankcase 6 located obliquely downward and rearward of the lower tank thereof.

As with the steering shaft 25, the radiator 26 is slantingly mounted so that its upper portion may be located rearward. An electrically-driven radiator fan 29 is attached to the rear surface of the radiator through stays or the like.

A resin-made body cover 31 appropriately covering the front body, respective resin-made front fenders 32 covering the front wheels from above to rearward, and a front protector 33 and a front carrier 34 both made of steel are attached to the front portion of the body frame 4. In addition, respective resin-made rear fenders 35 covering the rear wheels 3 from above to forward and a rear carrier 36 primarily made of steel are attached to the rear portion of the body frame 4. Incidentally, reference numeral 4*b* in the figure denotes a lower protection plate, which is provided to extend below the front reduction gear 11, an actuator unit 81 described later and the engine 5 so as to protect them against muddy water or the like splashing from the road surface.

Figure 1:
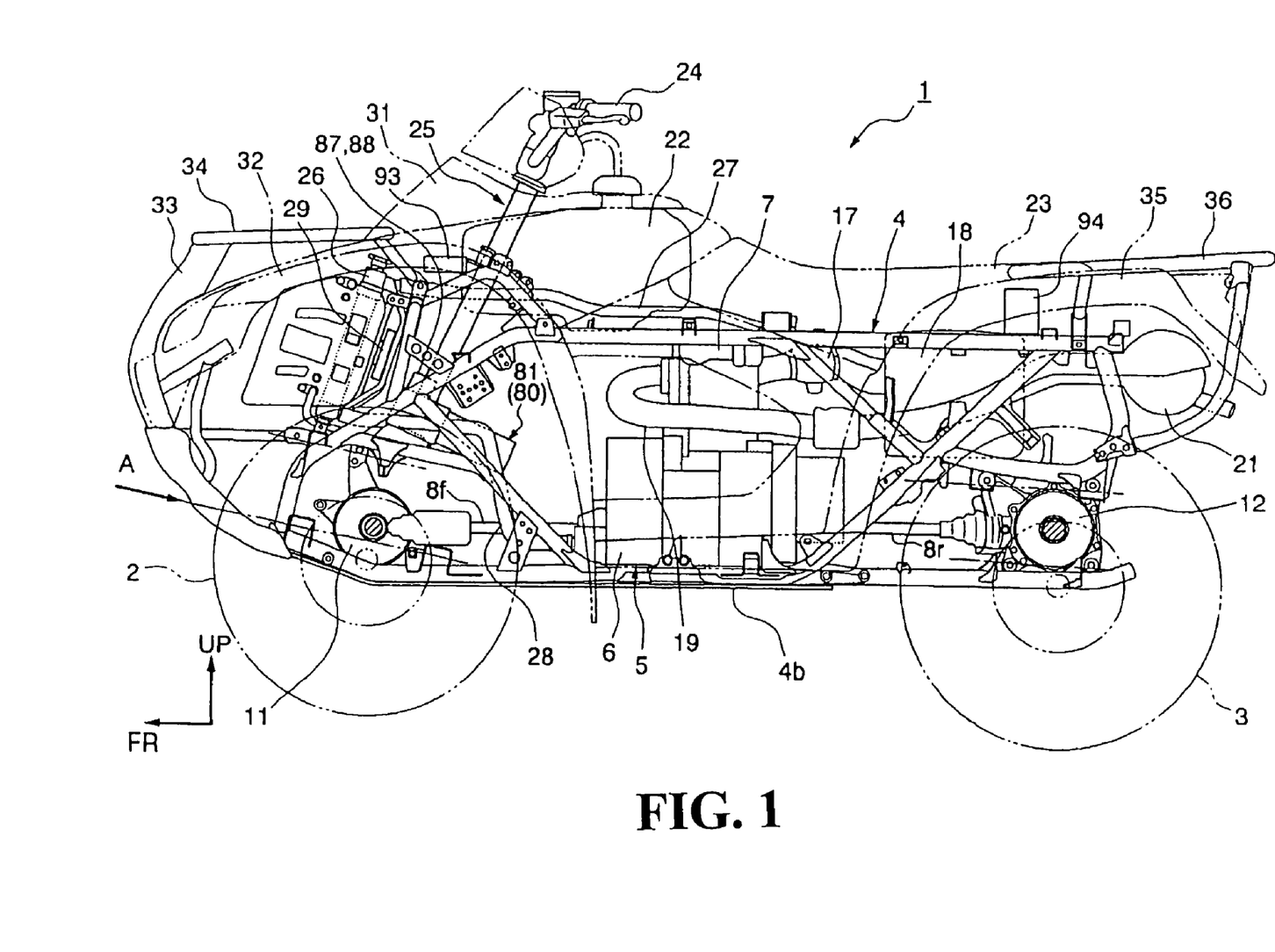
FIG. 1 is a side view of a buggy type four-wheeled vehicle according to an embodiment of the present invention.
Figure 2:
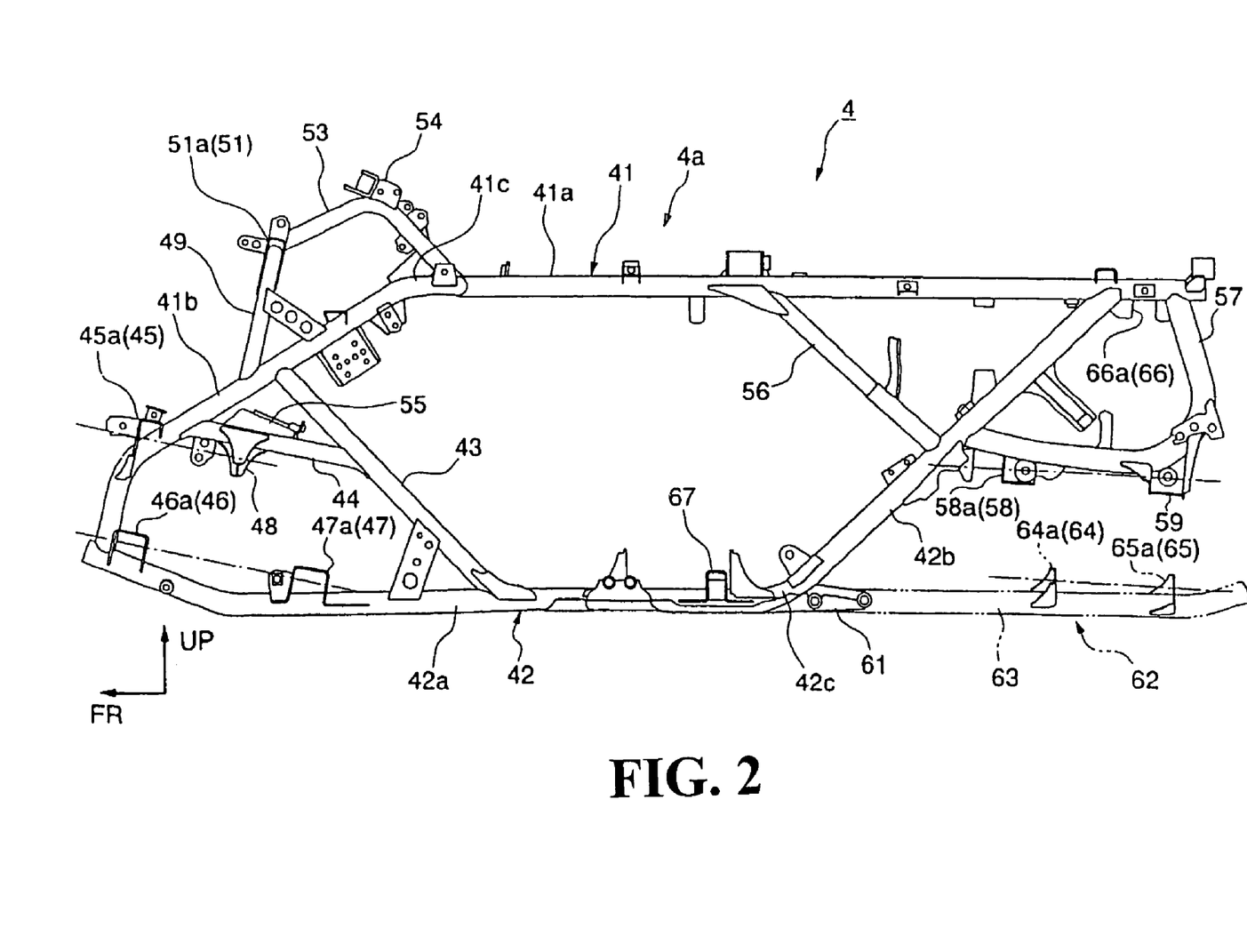
FIG. 2 is a side view of the body frame of the fur-wheeled vehicle.
Figure 3:
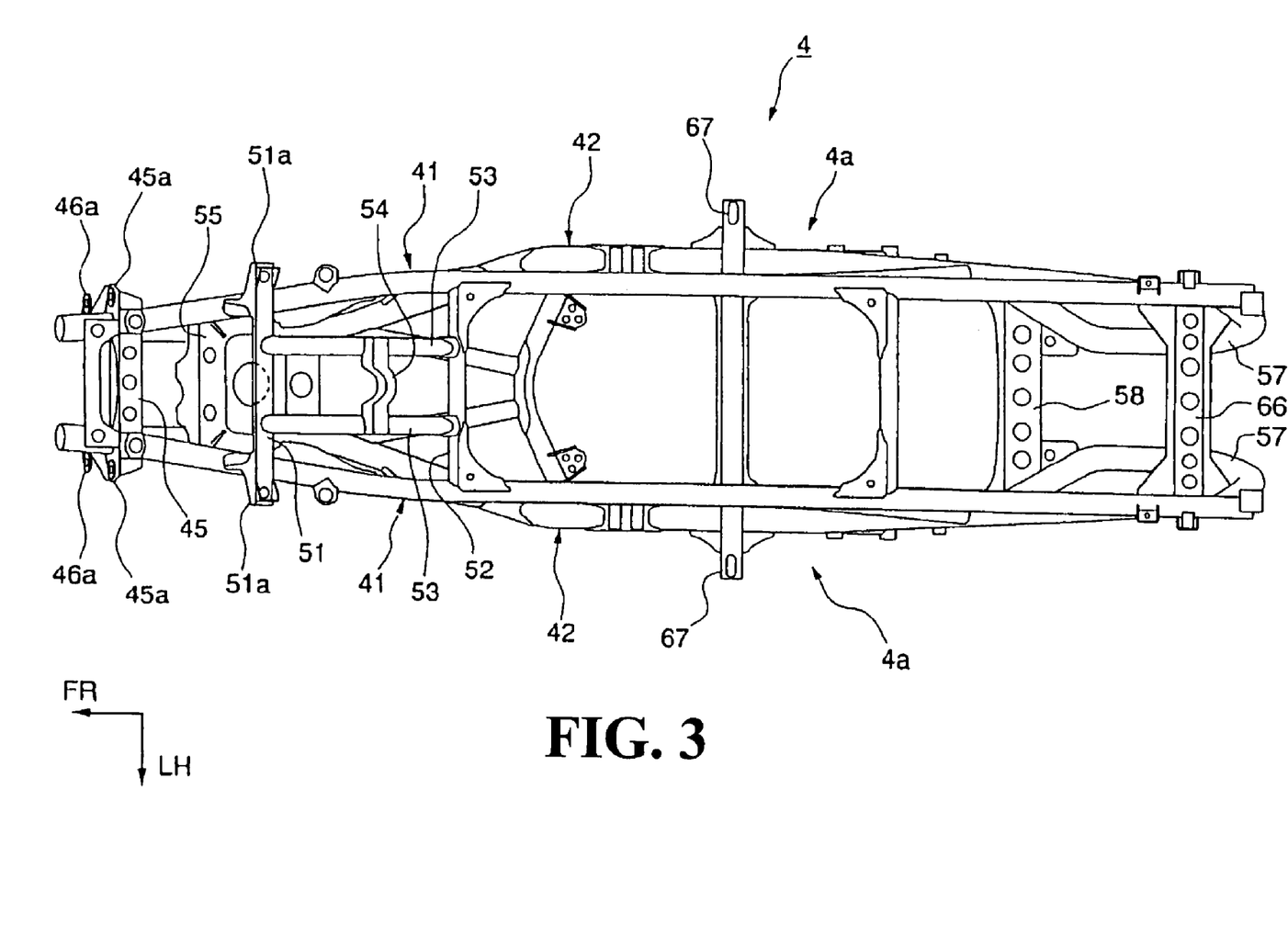
FIG. 3 is a top view of the body frame.

Referring to FIGS. 2 and 3 together with FIG. 1, the body frame 4 is formed by integrally joining a plurality of types of steel members (frame members) by welding or the like. More specifically, left and right upper pipes 41 and lower pipes 42 are used to constitute a pair of left and right closed-loop structures 4*a*, which are joined together through a plurality of cross members. Thus, a box structure extending the front and back direction is formed in the widthwise middle portion of the vehicle body.

The upper pipe 41 is formed by bending a single steel pipe so as to provide an upper horizontal portion 41*a* and a front slant portion 41*b*. When viewed laterally, the upper horizontal portion 41*a* extends rearward from a position spaced apart slightly rearward from the longitudinally almost-middle portion of the steering shaft 25. Similarly, the front slant portion 41*b* extends from the front end of the upper horizontal portion 41*a* forward and obliquely downward. A bent portion located between the upper horizontal portion 41*a* and the front slant portion 41*b* is referred to as a front bent portion 41*c* for explanation.

On the other end, the lower pipe 42 is formed by bending a single steel pipe so as to provide a lower horizontal portion 42*a* and a rear slant portion 42*b*. Likewise, when viewed laterally, the lower horizontal portion 42*a* extends forward from a position close to a bottom rear end of the engine 5. Similarly, the rear slant portion 42*b* extends from the rear end of the lower horizontal portion 42*a* obliquely upward and rearward. A bent portion located between the lower horizontal portion 42*a* and the rear slant portion 42*b* is referred to as a rear bent portion 42*c* for explanation.

The front end and rear end of each of the left and right upper pipes 41 configured as above are respectively joined to the front end and rear end of each of the left and right upper pipes 42 configured as above. Thus, a pair of left and right closed-loop structures 4*a* is formed which is almost parallelogrammatic as viewed laterally.

A gusset pipe 43 slanting forwardly upward is spanned between an intermediate portion of the front slant portion 41*b* of the upper pipe 41 and an intermediate portion of the lower horizontal portion 42*a* of the lower pipe 42. In addition, a sub-gusset pipe 44 slanting more moderately than the gusset pipe 43 is spanned between an intermediate portion of the gusset pipe 43 and the front slant portion 41*b* of the upper pipe 41.

An intermediate front cross member 45 is spanned between the respective front slant portions 41*b* of the left and right upper pipes 41, and a lower front cross member 46 and a lower rear front cross member 47 are spanned between the respective lower horizontal portions 42*a* of the left and right lower pipes 42.

Referring to FIG. 4 in addition to FIGS. 1 to 3, intermediate front support portions 45*a* are formed at both ends of the intermediate front cross member 45. The intermediate front support portions 45*a* are adapted to support the front sides of the proximal ends of upper arms 71 included in the front suspension 15. Each sub-gusset pipe 44 is provided with an intermediate rear support bracket 48 adapted to support the rear side of the proximal end of the upper arm 71.

On the other hand, the lower front cross member 46 is provided at both ends thereof with lower front support portions 46*a* adapted to support the front sides of the proximal portions of the lower arms 72 included in the front suspension. In addition, the lower rear cross member 47 is provided at both ends thereof with lower rear support portions 47*a* adapted to support the rear sides of the proximal portions of the lower arms 72.

A connection pipe 49 is attached onto the front slant portions 41*b* of the left and right upper pipes 41. The connection pipe 49 is formed in almost rectangle with one side open downward, as viewed from the front of the vehicle. The connection pipe 49 is joined at both ends thereof to the middle portions of the front slant portions 41*b*. An upper gusset 51 is attached to the upper side portion of the connection pipe 49. The upper gusset 51 is provided at both ends thereof with frame side mounts 51 adapted to support the upper ends of cushion units 74 (shock absorbers) included in the front suspension 15.

Figure 5:
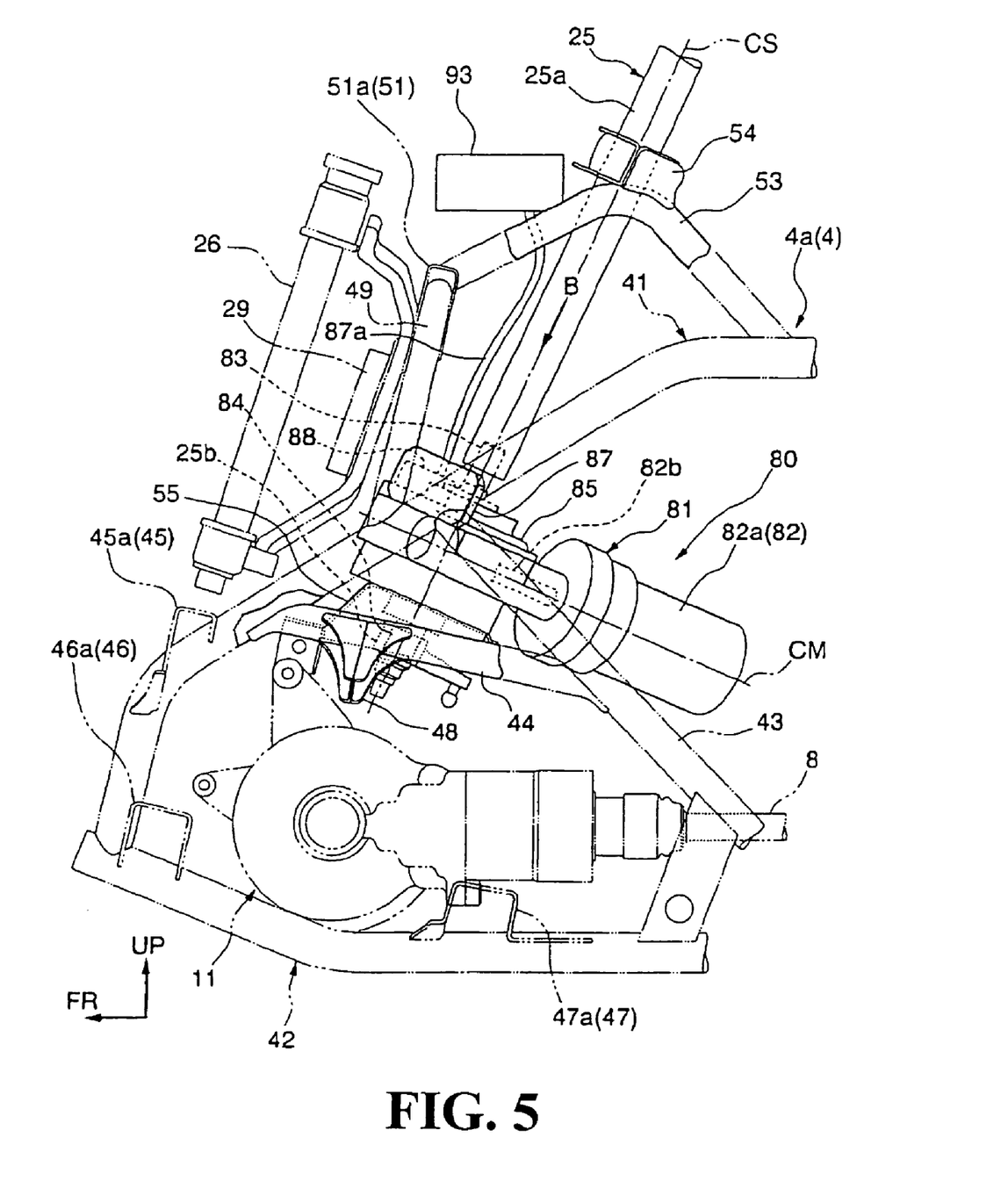
FIG. 5 is a side view illustrating the front of the vehicle body of the four-wheeled vehicle.

Referring to FIG. 5 in addition to FIGS. 1 to 4, a pair of left and right top pipes 53 each formed to be almost-L shaped as viewed laterally is spanned between the upper gusset 51 and an upper cross pipe 52. The upper cross pipe 52 is spanned between the left and right upper pipes 41 at locations near the corresponding front bent portions 41*c*. The top (corresponding to the highest portion of the body frame 4) of each top pipe 53 is located at a position coincident with the steering shaft 25, as viewed laterally. An upper support bracket 54 adapted to support the upper portion of the steering shaft 25 is spanned between the left and right tops. On the other hand, a lower support bracket 55 adapted to support a portion, near the lower end, of the steering shaft 25 is spanned between the sub-gusset pipes 44.

As shown in FIGS. 2 and 3, a rear gusset pipe 56 slating forward upward is spanned between the middle portion of each upper horizontal portion 41*a* included in the upper pipe 41 and the middle portion of each rear slant portion 42*b* included in the lower pipe 42. A rear sub-pipe 57 is provided rearward and downward of the upper pipe 41 and the lower pipe 42. The rear sub-pipe is bent to be convex rearward and obliquely downward as viewed laterally. The rear sub-pipe 57 is joined at both ends thereof to the rear end of the upper pipe 41 and the middle portion of the rear slant portion 42*b*.

An intermediate front cross member 58 is spanned between the lower portions of the left and right rear sub-pipes 57. The intermediate front cross member 58 is formed at both ends thereof with intermediate front support portions 58*a* adapted to support the front sides of the proximal portions of the upper arms included in the rear suspension. Intermediate rear support portions 59 adapted to support the rear sides of the proximal portions of the upper arms are provided at portions of the rear sub-pipes 57 rearward of the intermediate front cross member 58.

A rear connection bracket 61 projecting rearward is provided at the rear bent portion 42*c* of the lower pipe 42. The rear connection bracket 61 is adapted to support the front end of a rear sub-frame assembly 62.

The rear sub-frame assembly 62 is formed by integrally joining a pair of left and right lower sub-pipes 63 extending in the forward and back direction, a lower front cross member 64 and a lower rear cross member 65 both spanned between the lower sub-pipes 63, by welding or the like. The lower front cross member 64 is formed at both ends thereof with lower front support portions 64*a* adapted to support the front sides of the proximal portions of the lower arms included in the rear suspension. In addition, the lower rear cross member 65 is formed at both ends thereof with lower rear support portions 65*a* adapted to support the rear sides of the proximal portions of the lower arms included in the rear suspension.

A rear upper cross member 66 is spanned between the rear ends of the left and right upper pipes 41. The rear upper cross member 66 is formed at both ends thereof with frame side mounts 66*a* adapted to support the upper ends of cushion units (shock absorbers) included in the rear suspension. A step bar 67 together with a step board spanned between the front fender 32 and the rear fender 35 constitutes an occupant step portion.

As shown in FIG. 4, the front suspension 15 includes the left and right upper arms 71 and lower arms 72, the left and right knuckles 73, and the left and right cushion units 74. The upper arms 71 and lower arms 72 are supported on its proximal sides by the body frame 4 vertically swingably. The knuckles 73 are supported by the leading ends of the upper arms 71 and lower arms 72. The cushion units 74 are interposed between the lower arms 72 and the body frame 4.

Figure 6:
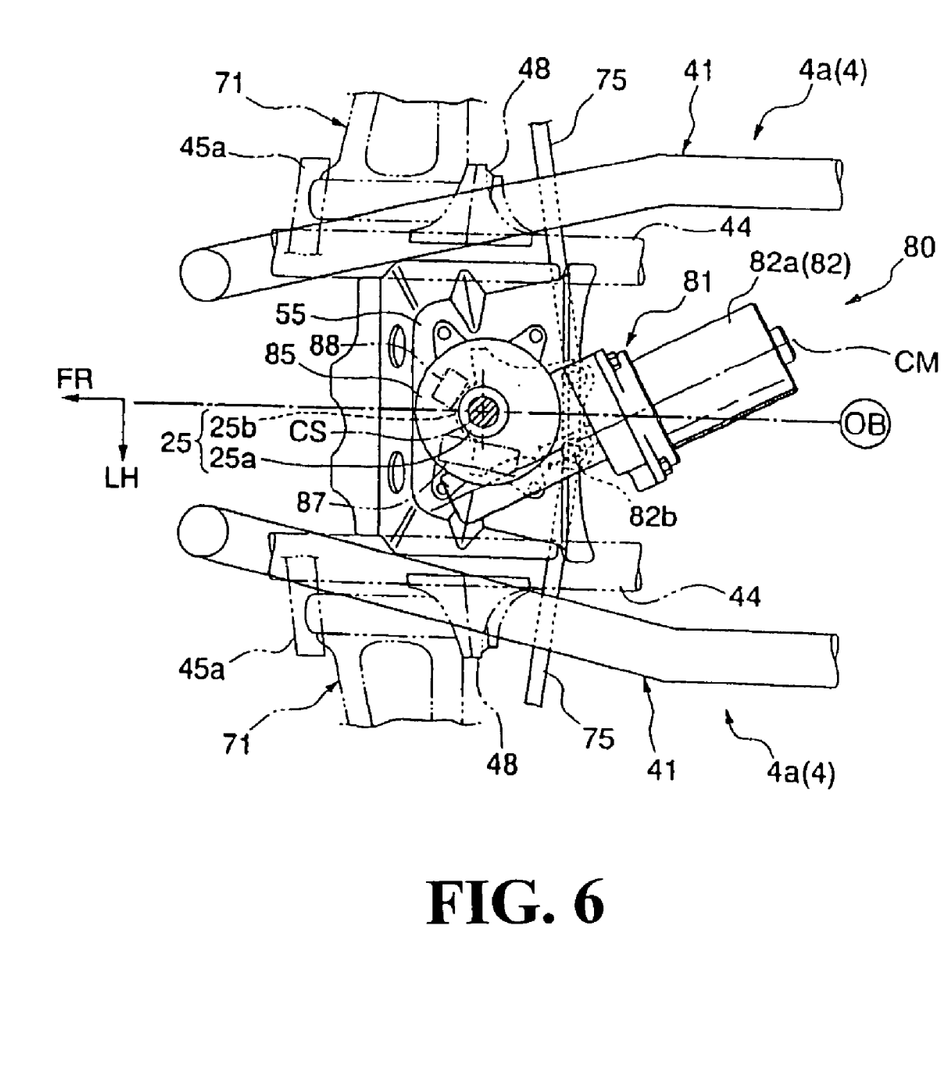
FIG. 6 is a view as viewed from arrow B in FIG. 5.

Referring to FIG. 6 in addition to FIGS. 1 to 5, the upper arm 71 bifurcates from its distal end side to its proximal end side as viewed from above. On the proximal end side of the upper arm 71, a pivot pipe portion 71*a* extending along a pivot shaft is spanned between both the bifurcate ends of the upper arm 71. Likewise, also the lower arm 72 bifurcates from its distal end side to its proximal end side as viewed from above (not shown) and a pivot pipe portion 72*a* extending along a pivot shaft is spanned between both the bifurcate ends of the lower arm 72. Incidentally, in FIG. 6, symbol 0B denotes a vehicle body widthwise centerline. A relatively heavy power assist motor 82 is disposed in proximity to this centerline 0B, thereby providing satisfactory weight balance with respect to the left and right of the vehicle body.

The pivot pipe portion 71*a* of the upper arm 71 is journaled at its front portion and rear portion on the intermediate front support portion 45*a* and intermediate rear support bracket 48, respectively, of the upper arm 71 through corresponding pivot shafts. The front and rear pivot pipe portions 72*a* of the lower arm 72 are journaled on the lower front support portion 46*a* and the lower rear support portion 47*a*, respectively, of the body frame 4 through corresponding pivot shafts. Incidentally, the intermediate front support portion 45*a* and intermediate rear support bracket 48, as well as the lower front support portion 46*a* and lower rear support portion 47*a* are also part of the front suspension 15.

The knuckle 73 is connected at its upper portion and lower portion to the distal ends of the upper arm 71 and lower arm 72 through ball joints 71*b* and 72*b*, respectively. The hub 2*a* of the front wheel 2 is supported for rotation on the outside of the knuckle 73. A disk brake 2*b* as a front brake is provided inside the front wheel 2.

An arm side mount 71*c* projecting upward is provided at a position on the upper side, and near the distal end, of the upper arm 71. The cushion unit 74 is connected at its lower end to the arm side mount 71*c* through a connection shaft parallel to the pivot shaft mentioned above. Likewise, the cushion unit 74 is connected at its upper end to a frame side mount 51*a* of the body frame 4 through a connection shaft parallel to the pivot shaft mentioned above.

With this configuration, when each front wheel 2 receives an impact load from the road surface, the corresponding components described above are vertically swung through the upper arum 71 and the lower arm 72 individually in terms of the left and right of the vehicle, and each of the left and right cushion units 74 are expanded and contracted. Thus, the cushion unit 74 moderately absorbs the impact load through its cushioning. Incidentally, a rear suspension has the same configuration as that of the front suspension 15 and its description is omitted.

As shown in FIGS. 4 and 5, the front reduction gear 11 is disposed at the widthwise almost-middle portion of the body frame 4, and between the lower front cross member 46 and the lower rear cross member 47. The front reduction gear 11 decelerates the rotation of the propeller shaft 8*f* extending forward from the crankcase 6 of the engine 5 and converts the rotation into the rotation of the left and right front drive shafts 13.

The left and right external output portions of the front reduction gear 11 are respectively connected to the hub portions 2*a* of the left and right front wheels 2 through the left and right front drive shafts 13 each provided at both ends thereof with universal joints. The driving force from the engine 5 is transmitted to each of the left and right front wheels 2 through the propeller shaft 8*f*, the front reduction gear 11 and corresponding one of the left and right front drive shaft 13.

The lower end of the steering shaft 25 is located in vicinity to the lower front reduction gear 11, and is connected to a pair of left and right knuckles 73 through a pair of left and right tie-rods 75, respectively. With this configuration, as the steering shaft 25 is rotated, the knuckles 73 and the front wheels 2 are steered in the same direction through the tie-rods 75.

Now, as FIG. 5 shows, the buggy type four-wheeled vehicle 1 includes an electrically-driven power steering system 80 which reduces handle-steering force, i.e., front wheel-steering force.

This power steering system 80 includes: a power assist motor 82-integral type actuator unit 81 provided at the middle portion of the steering shaft 25; and a control unit 9 as an electric control unit (ECU) which drivingly controls the power assist motor 82 on the basis of a value detected by a torque sensor 91 (see FIG. 8) built in the actuator unit 81. More specifically, in the power steering system 80, the electric power of the battery 94 is supplied to the control unit 93 and then supplied to the actuator unit 81.

The steering shaft 25 is configured to be divided into an upper shaft 25*a* and a lower shaft 25*b* with respected to the actuator unit 81. The upper shaft 25*a* is coaxially coupled at its lower end to the input shaft 83 of the actuator unit 81 and the lower shaft 25*b* is coaxially coupled at its upper end to the output shaft 84 of the actuator unit 81. The input and output shafts 83 and 84 are coupled to each other through a torsion bar 92 (see FIG. 8) serving as part of the torque sensor 91 in the housing 85 of the actuator unit 81.

Since the front wheels 2 receive grounding resistance, the rightward or leftward operation of the handlebar 24 produces relative rotary force between the input shaft 83 mechanically connected to the handlebar 24 and the output shaft 84 mechanically connected to each front wheel 2.

When the relative rotary force occurs, the torsion bar 92 interposed between the input and output shafts 83 and 84 suffers torsion. Rotary torque applied to the steering shaft 25, i.e., steering torque applied to the handlebar 24 is detected as a detection value on the basis of the torsion. A signal corresponding to the detection value is inputted to the control unit 93, whereby the power assist motor 82 is drivingly controlled on the basis of the signal.

Figure 7:
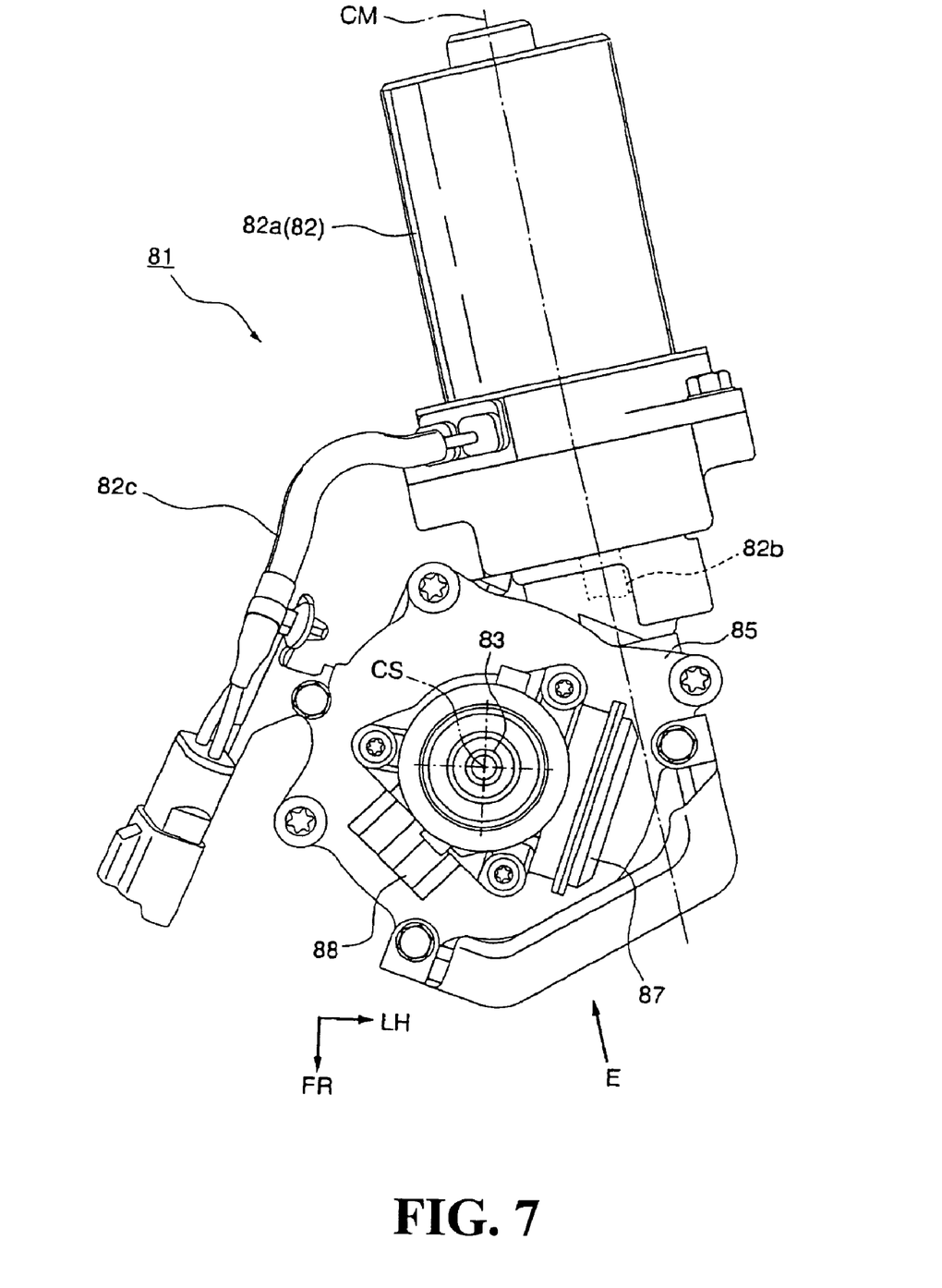
FIG. 7 is a top view of an actuator unit as viewed from the arrow direction of FIG. 6.
Figure 8:
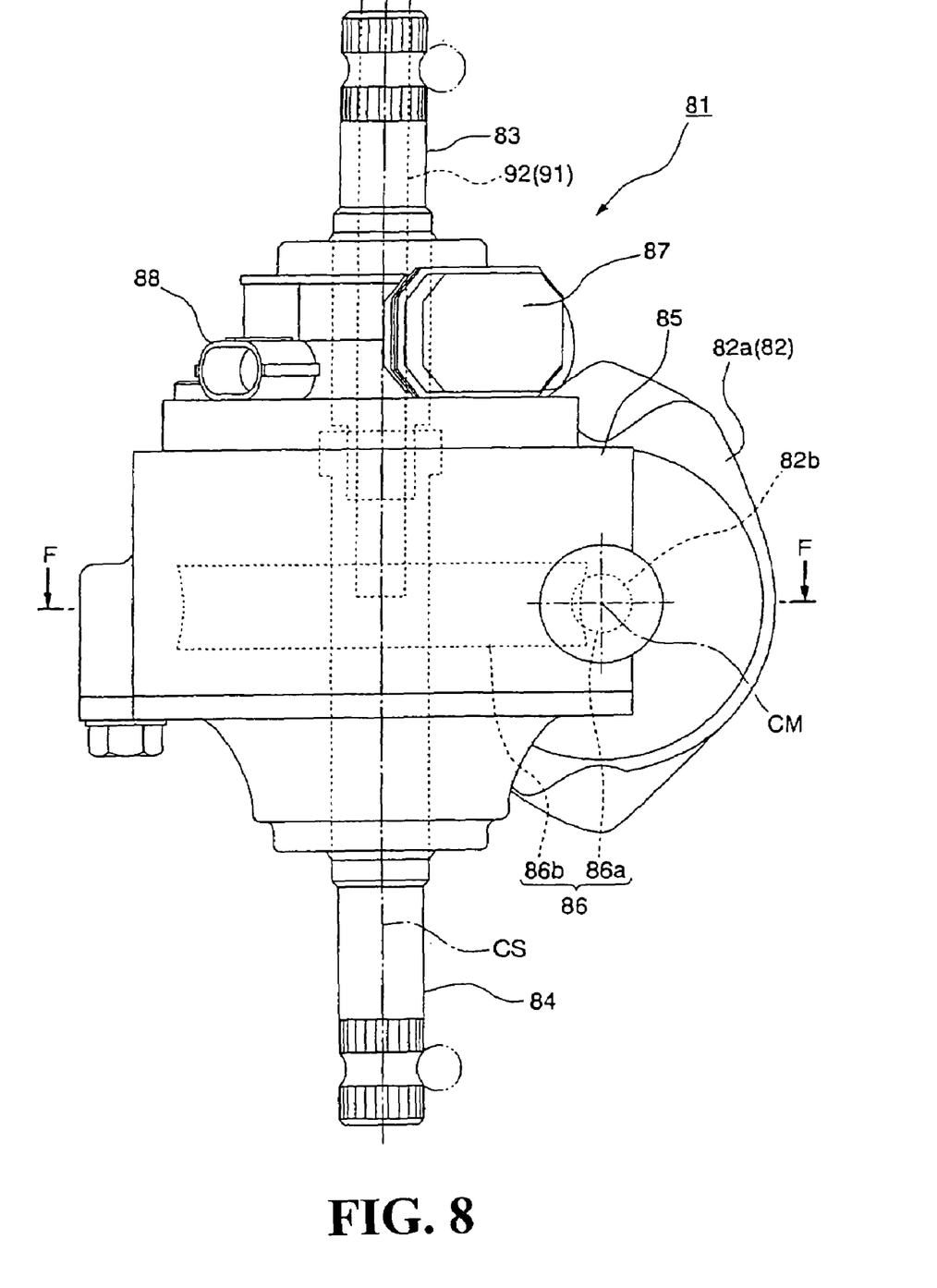
FIG. 8 is a view as viewed from arrow E in FIG. 7.
Figure 9:
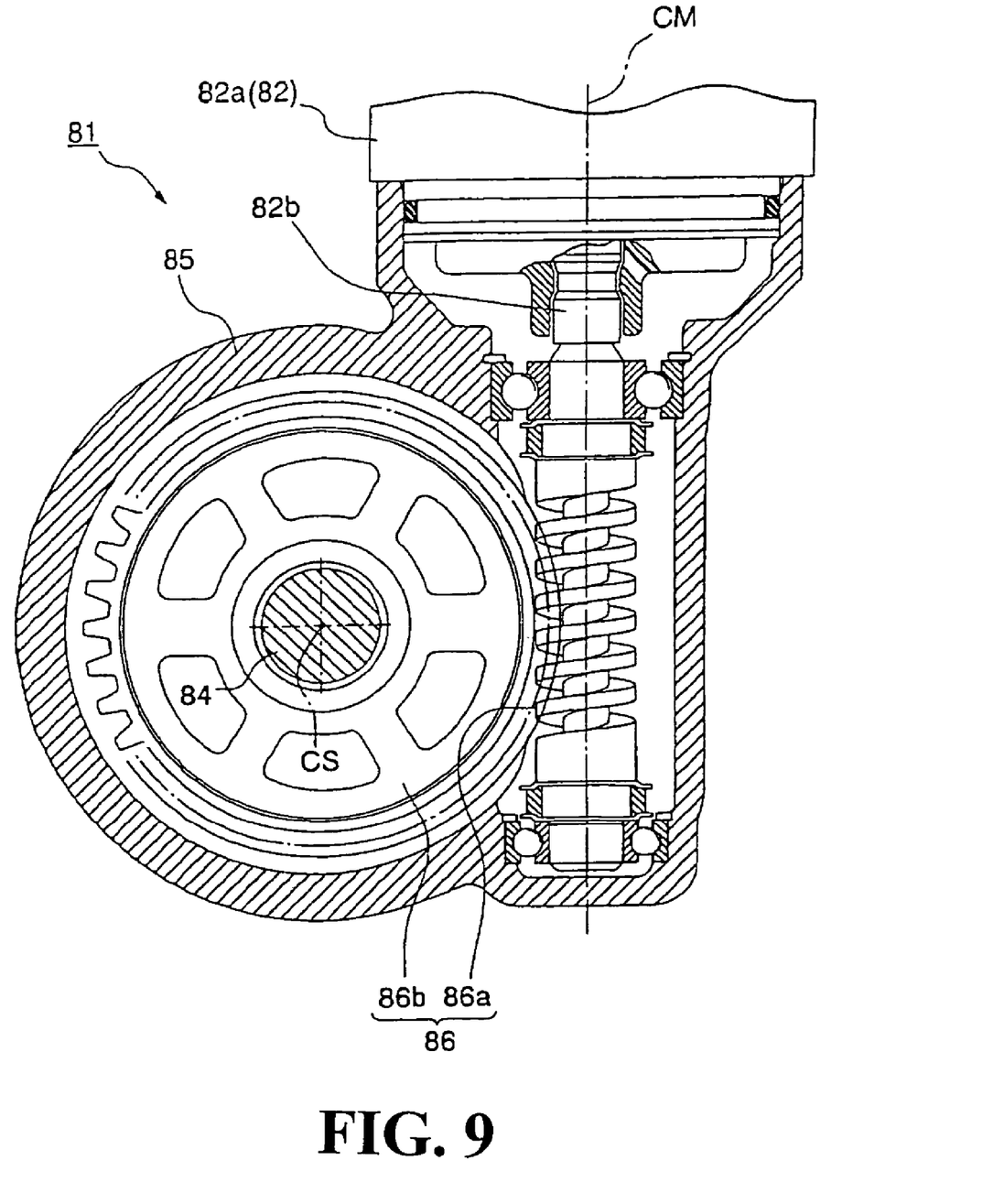
FIG. 9 is a cross-sectional view taken along line F-F of FIG. 8.

As FIGS. 7, 8, and 9 show, the power assist motor 82 is configured such that a rotary shaft 82*b* projects coaxially from one end of the cylindrical motor main body 82*a*. The axis CM of the rotary shaft 82*b* is disposed perpendicular to the axis CS of the steering shaft 25. In this state, the motor main body 82*a* is secured to the housing 85 and the rotary shaft 82*b* extends into the housing 85. The rotary shaft 82*b* is engaged with the output shaft 84 through a worm gear pair (meshing portion) 86 housed in the housing 85.

That is to say, a worm gear 86*a* is coaxially attached to the leading end of the rotary shaft 82*b* of the power assist motor 82 and a worm wheel gear 86*b* is coaxially attached to the upper end of the output shaft 84. The meshing engagement of the gears 86*a* and 86*b* reduces the driving force of the power assist motor 82 and transmits it to the output shaft 84.

With such a configuration, when the handlebar 24 is rotated and operated, the steering shaft 25 (the output shaft 84) receives the rotary-operating force from the handlebar 24 and auxiliary rotary force from the power assist motor 82, which reduces handlebar-operating force. An amplifier circuit section 87 in FIG. 7 processes an electrical signal from the torque sensor 91 and includes a failure diagnosis circuit. A coupler 88 is a counterpart to an amplifier harness 87*a* (see FIG. 5) which connects the amplifier circuit section 87 to the control unit 93. The amplifier circuit section 87 and coupler 88 are attached to the outer wall the housing 85. Incidentally, reference numeral 82*c* denotes a harness used to supply power to the power assist motor 82.

Now, as shown in FIG. 5, the amplifier harness 87*a* is arranged right before the steering shaft 25 to extend along the same without being bundled together with other wiring so as to reduce noise. The amplifier harness 87*a* is fixed to the top pipe 53 with a band near the control unit 93.

As shown in FIGS. 5 and 6, the actuator unit 81 is located near the lower end of the steering shaft 25. In addition, its housing 85 (the worm gear pair 86) is fastened onto the lower support bracket 55 with bolts or the like so as to serve as one of the cross members which joins the closed loop structures 4*a* of the body frame 4. In this way, the housing is firmly fixed to the body frame 4. The housing 85 of the actuator unit 81 is provided to fit in the profile of the lower support bracket 55 as viewed from above.

The rotary shaft 82*b* of the power assist motor 82 is provided at a position adjacent to, obliquely rearward of, and on the left side of the steering shaft 25, and the motor main body 82*a* is provided to extend from the rotary shaft 82*b*, obliquely rearward and rightward (in other words, toward the middle of the body in the back-and-forth direction). With this configuration, the power assist motor 82 is positioned rearward of the steering shaft 25 and is disposed to be surrounded by the frame members constituting the body frame 4, in the inside of the same. In addition, the amplifier circuit section 87 and coupler 88 of the actuator unit 81 are disposed to overlap the frame members (the upper pipe 41 and the like) of the body frame 4 as viewed laterally.

The power assist motor 82 is disposed rearward of the front suspension 15 (the upper arms 71 and lower arms 72 as well as the cushion units 74), and above the intermediate front support portions 45*a* and intermediate rear support brackets 48 for supporting the upper arms 71. Incidentally, the power assist motor 82 is located on the downstream side of the air stream produced by the radiator fan 29 in front of the steering shaft 25, thereby improving cooling performance.

Figure 10:
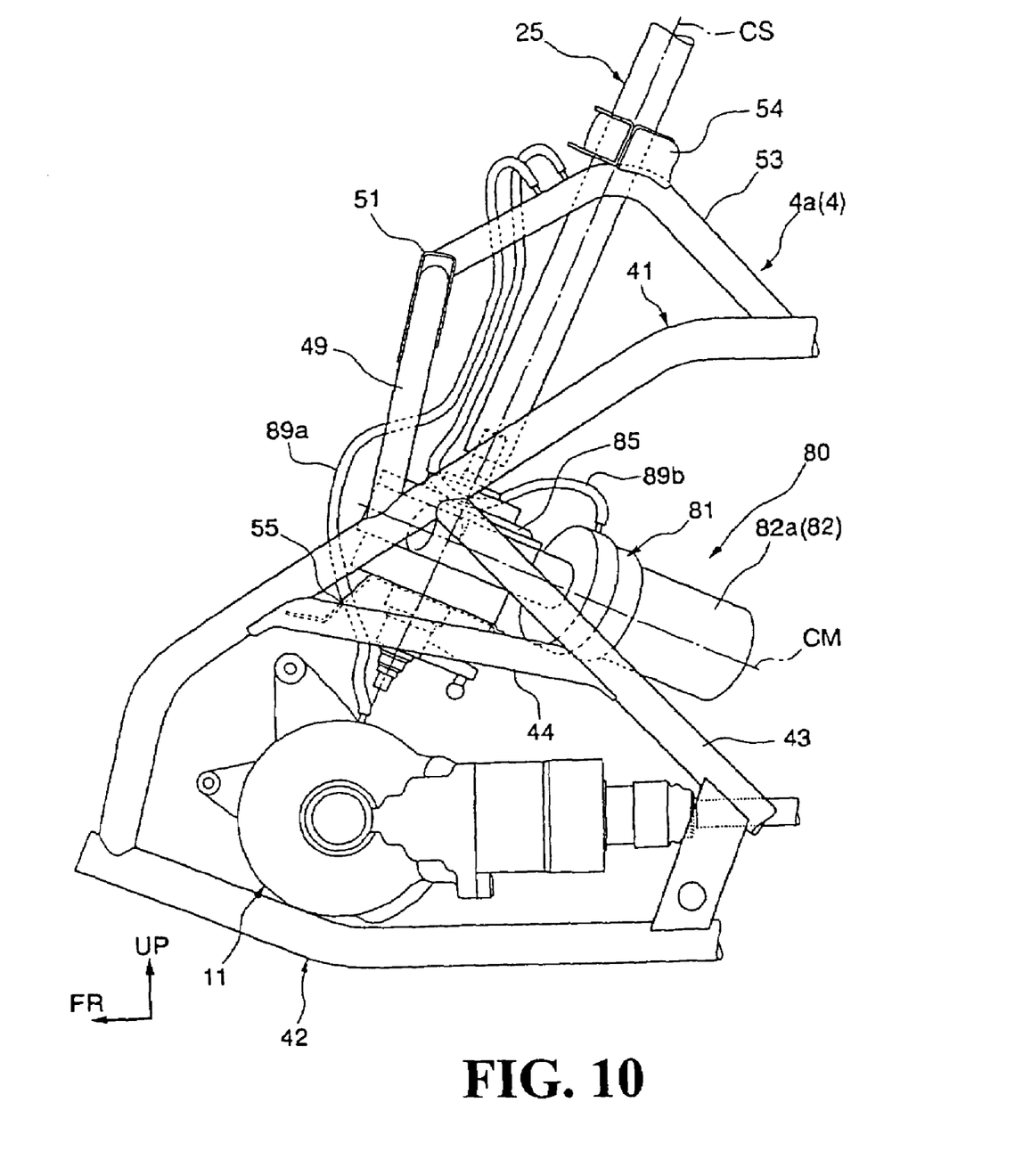
FIG. 10 is a side view corresponding to FIG. 5, illustrating the arrangement of breather hoses.

Meanwhile, vehicles have countermeasures for traveling in water with a determined depth. One of the countermeasures is that the front reduction gear 11 and the actuator unit 81 are liquid-tightly enclosed, and as shown in FIG. 10, breather hoses 89*a* and 89*b* for inner pressure adjustment are led from the front reduction gear 11 and the actuator unit 81 (the motor main body 82*a* of the power assist motor 82), respectively.

In order to prevent the complex arrangement of the breather hoses 89*a*, 89*b*, they are extended forward of the steering shaft 25, and then upward along and parallel to the same. Thereafter, the tips of the breather hoses are inserted into the upper pipe 41, i.e., a portion of the body frame 4.

With such a configuration, the arrangement of the breather hoses 89*a*, 89*b* is simplified, whereby the maintenance performance with respect to the surroundings of the steering shaft 25 is improved. Incidentally, if the breather hoses are not extended parallel to each other but are joined together along the way, the arrangement of the breather hoses 89*a*, 89*b* can be further simplified.

As described above, the power steering system 80 of the buggy type four-wheeled vehicle 1 according to the present invention is configured such that the steering shaft 25 rotated in response to the operation of the handlebar is disposed forward of the engine 5 located at the almost-middle in the back-and-forth direction of the body frame 4, the rotary shaft 82*b* of the power assist motor 82 is disposed perpendicular to the steering shaft 25, and the power assist motor 82 is placed inside the body frame 4.

With this configuration, the power assist motor 82 is surrounded by the frame members constituting the body frame 4, which makes it difficult to apply load from the outside to the power assist motor 82. In particular, the power assist motor 82 can be satisfactorily protected from obstacles encountered during traveling on the irregular ground or the like.

In addition, the power steering system 80 is configured such that the power assist motor 82 is disposed rearward of the steering shaft 25 and oblique with respect to the back-and-forth direction of the vehicle body as viewed from above. Consequently, the power assist motor 82, which is relatively heavy, is placed near the middle of the vehicle body, while the rearward extension of the power assist motor 82 can be suppressed. In other words, while the concentration of weight mass can be provided by disposing the power assist motor 82 near the middle of the vehicle body, the interference between the power assist motor 82 and the engine 5 can be avoided satisfactorily.

Further, in the power steering system 80, since the power assist motor 82 is disposed rearward of the front suspension 15, the concentration of the weight of the power assist motor 82 on the front wheels 2 can be suppressed. In other words, an increase in load applied to the front wheels due to provision of the power assist motor can be minimized.

Additionally, in the power steering system 80, the front suspension 15 includes the intermediate rear support bracket 48 of the body frame 4 which supports the upper arm 71 and the power assist motor 82 is disposed above the intermediate rear support bracket 48. Accordingly, the power assist motor 82 does not reduce the minimum height of the buggy type four-wheeled vehicle 1. That is to say, it is possible to prevent reduction in the minimum height of the four-wheeled vehicle 1 due to the provision of the power assist motor 82.

Meanwhile, as FIG. 7 shows, the amplifier circuit section 87 and coupler 88 included in the actuator unit 81 are disposed forward of the steering shaft 25 (in detail, with the centerline LA of the amplifier circuit section 87 and the centerline LB of the coupler 88 faced forward of the referential line LH extending along the widthwise direction of the vehicle) and are disposed on the obliquely front left side and obliquely front right side, respectively, above the upper surface of the housing. In this case, the amplifier circuit section 87 and the coupler 86 are located above the worm gear pair 86 and provided to fit in the profile of the housing 85 which houses the worm gear pair 86, as viewed from above.

As described above, the power steering system 80 of the buggy type four-wheeled vehicle 1 in the above embodiment is such that the rotary shaft 82*b* of the power assist motor 82 is disposed perpendicular to the steering shaft 25 slanted so that its upper portion may be located rearward, the power assist motor 82 is controlled in response to a signal detected by the torque sensor 91, the engine 5 is disposed rearward of the steering shaft 25, and the amplifier circuit section 87 and coupler 88 of the torque sensor 91 are disposed forward of the steering shaft 25.

With this configuration, the amplifier circuit section 87 and the coupler 88 are spaced from the engine 5 with the steering shaft 25 put between the engine 5 and, the amplifier circuit section 87 and the coupler 88.

In addition, the power steering system 80 is provided with the housing 85 which covers the worm gear pair 86 serving as a meshing portion of the power assist motor 82 and the steering shaft 25 and the amplifier circuit section 87 and the coupler 88 are located above the housing 85. As a result, a distance between the power assist motor 82 and, the amplifier circuit section 87 and the coupler 88 is reduced, and since they are located above the housing 85, the amplifier circuit section 87 and the coupler 88 are less likely to be splashed with muddy water or the like from the road surface. Since the control unit 93 is located above the coupler 88, the wiring (amplifier harness 87*a*) between the coupler 88 and the control unit 93 can be reduced in length, thereby providing simplified wiring and reduced noise. Since the amplifier circuit section 87 or the coupler 88 is located above the housing 85, the amplifier circuit section 87 and the coupler 88 can be satisfactorily protected against muddy water or the like.

Meanwhile, the present invention is not limited to the embodiment described above, and it is apparent that, for example, the detailed structure of the body frame or the like can be variously changed or modified in the range without departing from the gist of the present invention. In addition, while the amplifier circuit section 87 and the coupler 88 are separated from each other in the embodiment, both can be united as one body. If the amplifier circuit section 87 and the control unit 93 are united as one body, the coupler 88 can be disposed forward of the steering shaft 25.

Figure 11:
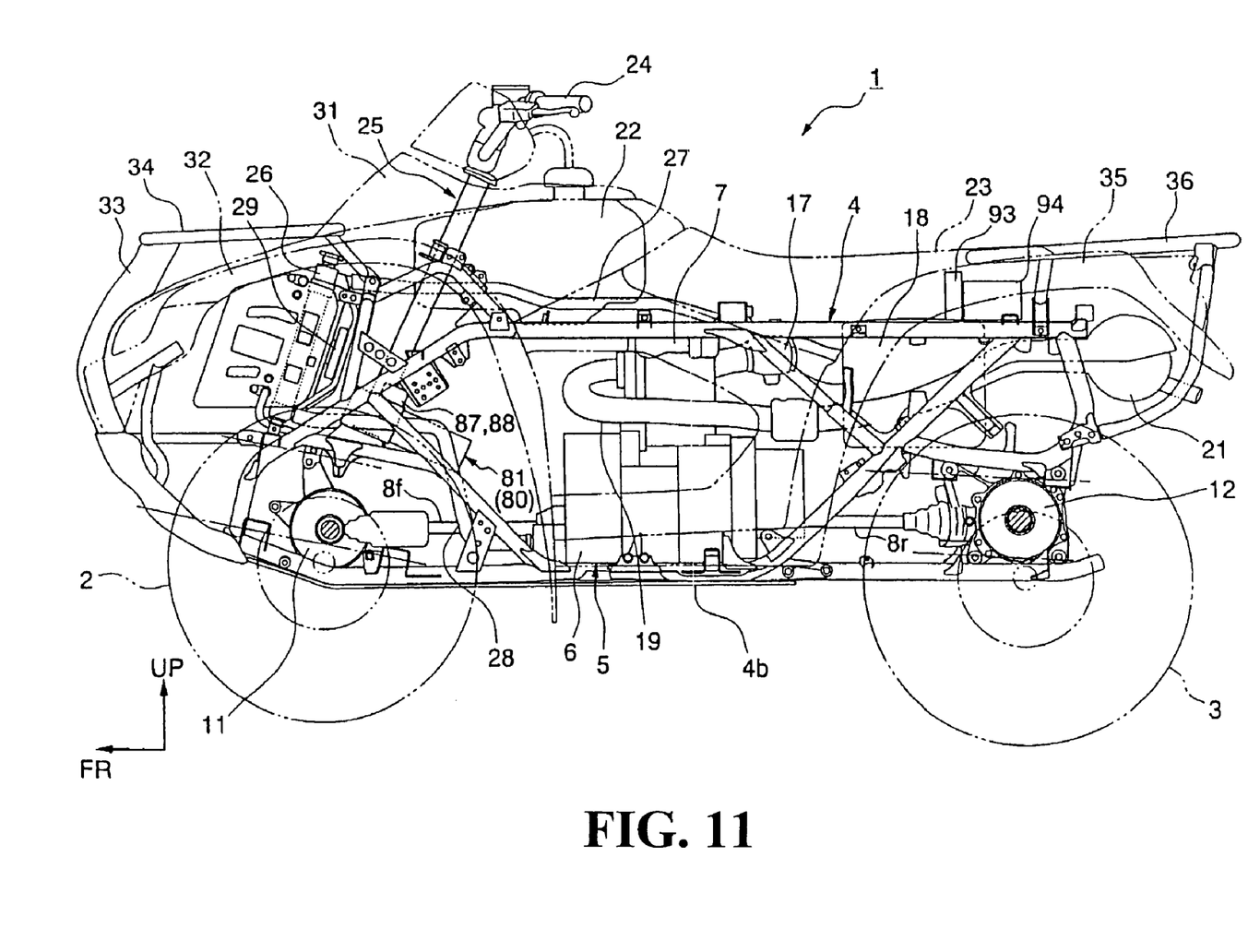
FIG. 11 is a plan view corresponding to FIG. 1, illustrating the variation of the four-wheeled vehicle described above.

As shown in FIG. 11, if the control unit 93 is disposed rearward of the steering shaft 25 (for example, it is disposed adjacent to the battery 94 located at the rear portion of the vehicle body), the amplifier circuit section 87 and the coupler 88 may be disposed rearward of the steering shaft 25 in order to reduce the length of the wiring extending between the control unit 93 and, the amplifier circuit section 87 and the coupler 88.

Figure 12:
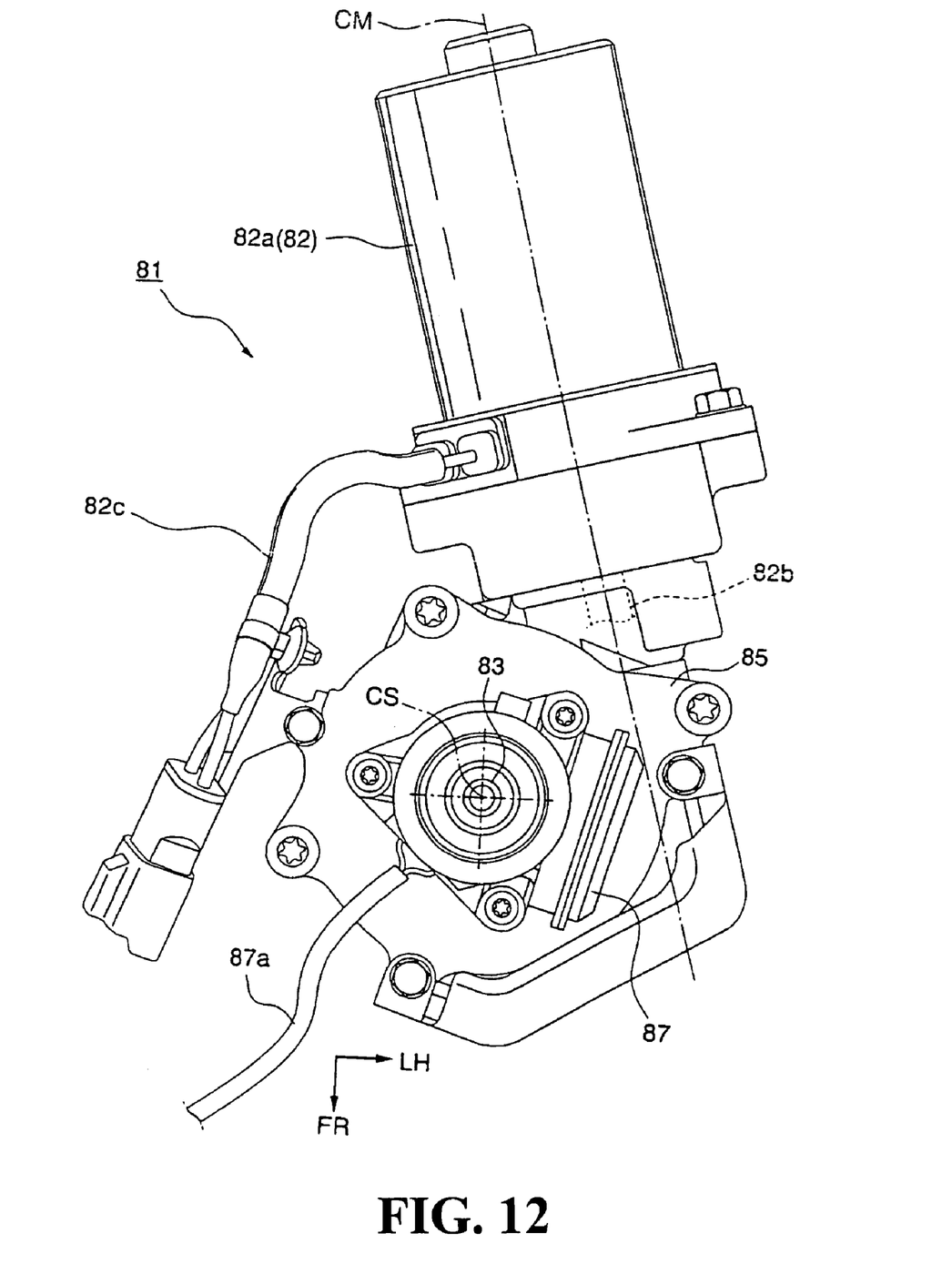
FIG. 12 is a side view corresponding to FIG. 7, illustrating the variation of the actuator unit described above.

In addition, as FIG. 12 shows, the actuator unit 81 may be configured such that an amplifier harness 87a is directly connected to the actuator unit 81 not provided with the coupler 88.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power steering system for an all-terrain buggy vehicle, comprising:
    a steering shaft rotated in response to operation of a handlebar, the steering shaft being disposed forward of an engine located near a middle in a back-and-forth direction of a body frame; and
    a power assist motor having a rotary shaft disposed perpendicular to the steering shaft;
    wherein the power assist motor is located inside the body frame in a position rearward of the steering shaft,
    wherein a left arm support member is provided on a left portion of the body frame, and a right arm support member is provided on a right portion of the body frame,
    the left and right arm support members being adapted to suspend a front wheel in the body frame,
    wherein an axis CM of the power assist motor is in vicinity of a centerline of a vehicle body in a widthwise direction thereof, and is disposed perpendicular to an axis CS of the steering shaft.

2. The power steering system for an all-terrain buggy vehicle according to claim 1, wherein the power assist motor is disposed obliquely with respect to the back-and-forth direction of a vehicle body as viewed from above.

3. The power steering system for an all-terrain buggy vehicle according to claim 1, wherein the power assist motor is disposed rearward of a front wheel suspension.

4. The power steering system for an all-terrain buggy vehicle according to claim 2, wherein the power assist motor is disposed rearward of a front wheel suspension.

5. The power steering system for an all-terrain buggy vehicle according to claim 1, wherein the power assist motor is disposed above the arm support member.

6. The power steering system for an all-terrain buggy vehicle according to claim 2, wherein the power assist motor is disposed above the arm support member.

7. The power steering system for an all-terrain buggy vehicle according to claim 3, wherein the power assist motor is disposed above the arm support member.

8. A power steering system for an all-terrain buggy vehicle, comprising:
    a steering shaft rotated in response to operation of a handlebar, the steering shaft being disposed forward of an engine located near a middle in a back-and-forth direction of a body frame; and
    a power assist motor having a rotary shaft disposed perpendicular to the steering shaft;
    wherein the power assist motor is located inside the body frame between right and left gusset pipes,
    wherein the right gusset pipe is provided with a right arm support member, and the left gusset pipe is provided with a left arm support member,
    the right and left arm support members being adapted to suspend a front wheel in the body frame.

9. The power steering system for an all-terrain buggy vehicle according to claim 8, wherein the power assist motor is disposed rearward of the steering shaft and obliquely with respect to the back-and-forth direction of a vehicle body as viewed from above.

10. The power steering system for an all-terrain buggy vehicle according to claim 8, wherein the power assist motor is disposed rearward of a front wheel suspension.

11. The power steering system for an all-terrain buggy vehicle according to claim 9, wherein the power assist motor is disposed rearward of a front wheel suspension.

12. The power steering system for an all-terrain buggy vehicle according to claim 8, wherein the power assist motor is disposed above the arm support member.

13. The power steering system for an all-terrain buggy vehicle according to claim 9, wherein the power assist motor is disposed above the arm support member.

14. The power steering system for an all-terrain buggy vehicle according to claim 10, wherein the power assist motor is disposed above the arm support member.

15. The power steering system for an all-terrain buggy vehicle according to claim 8, wherein an axis CM of the power assist motor is in vicinity of a centerline of a vehicle body in a widthwise direction thereof, and is disposed perpendicular to an axis CS of the steering shaft.

* * * * *